Figure 1:
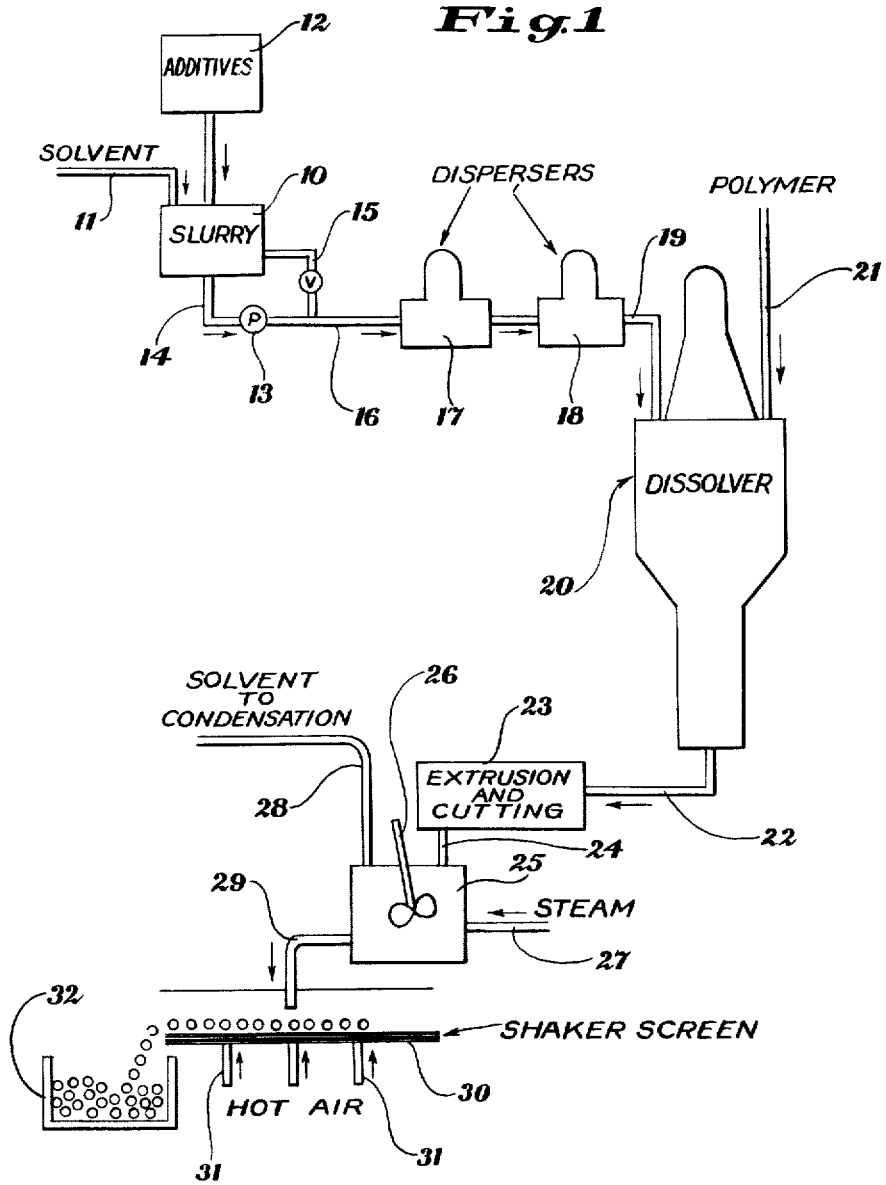

April 16, 1963 D. C. HULL ETAL 3,085,988
PROCESS FOR INCORPORATING ADDITIVES INTO
POLYMERS AND RESULTING PRODUCT
Filed Nov. 7, 1957 2 Sheets-Sheet 2

David C. Hull
Samuel B. Vaughn, Jr.
INVENTORS

BY R. Frank Smith
Harold N. Powell
ATTORNEYS

United States Patent Office 3,085,988
Patented Apr. 16, 1963

3,085,988
PROCESS FOR INCORPORATING ADDITIVES INTO POLYMERS AND RESULTING PRODUCT
David C. Hull and Samuel B. Vaughn, Jr., Longview, Tex., assignors to Eastman Kodak Company, Rochester, N.Y., a corporation of New Jersey
Filed Nov. 7, 1957, Ser. No. 695,013
10 Claims. (Cl. 260—33.6)

This invention relates to process and apparatus for incorporating various additives into polymeric compositions. More particularly, this invention relates to improved procedure for incorporating finely-divided carbon black into polyethylene and to the resultant improved products obtained thereby.

The problem of satisfactorily incorporating additives such as pigments and the like into plastic compositions has long existed in industry. A large number of methods and apparatus have been proposed in various publications and patents. Many of the prior art procedures have involved mixing or grinding the plastic base material with the pigment additive either to incorporate the additive directly or to obtain a concentrate which is later incorporated with further base material. Certain other procedures have involved mixing together simultaneously the plastic base material, solvent or plasticizer, and the additive. In general, the prior art procedures have required considerable power input to accomplish the mixing or grinding. Even with a vigorous grinding for extended periods, in many instances the additive has not been distributed into the base material to the extent that might be desired for producing a quality product.

It is apparent, therefore, that providing a method and apparatus whereby additives such as carbon black may be better incorporated into polymeric base materials represents a highly desirable result. After extended investigation we have found an improved method and apparatus whereby better intermediate and final products may be produced.

This invention has for one object to provide an improved method and apparatus for incorporating additives into plastic base materials. A particular object is to provide a method and apparatus which is especially suitable for incorporating carbon black into polyethylene compositions. Still another object is to provide a method for manufacturing a polyethylene pellet which contains an additive, which pellet may be used to blend with further polyethylene. Still another object is to manufacture polyethylene products exhibiting better resistance to weather and stress cracking. Another object is to provide novel apparatus arrangement for accomplishing the foregoing process and product objectives. Other objects will appear hereinafter.

While as already mentioned it is known to incorporate additives such as pigments into various base materials for coloring these materials or for other purposes and that the products obtained by such prior art procedures have possessed good properties, certain problems have been encountered. Even with employing mixing and grinding equipment and supplying considerable power input the distribution of the additive has frequently been accomplished only with some difficulty. This is particularly the situation when very finely divided additives are to be incorporated into such base materials. There is considerable tendency for such finely divided additives to agglomerate into larger clusters, which larger clusters may exhibit a greater tendency to settle out.

In the broader aspects of the present invention we have found that if the additive such as a finely divided pigment is first dispersed in a certain manner into a solvent for the base material to which the additive is ultimately to be incorporated and that certain other procedures are followed as will be described in detail hereinafter, that improved results may be obtained. In further detail and in accordance with our preferred embodiment, a slurry comprising a predetermined amount of the additive as, for example, carbon black and a solvent is made up. The solvent chosen is a solvent for the polymeric base material with which the additive is later to be incorporated, and in addition to its solvent properties it preferably will wet the additive. This slurry which is comprised of the additive and the solvent which is made up in a preliminary manner is the subjected to a special treatment which, in accordance with our preferred embodiment, comprises a special dispersing treatment usually of at least two operations. We have found by this treatment which we refer to as dispersion that the additive is not only quite uniformly distributed in the solvent but that a relatively stable slurry is obtained. Even with very fine particles, for example, of 17–25 millimicron diameter, there is little tendency in slurrys of the present invention for the particles to agglomerate or settle out even though a relatively high amount of the additive has been incorporated into the solvent.

Other additives that will not distill out with the solvent in a later step may also be added and dispersed along with the pigment. These additives can be soluble or insoluble in the solvent. If the anti-oxidant is of a type that will not distill out this is the preferable point of addition in order that it may be uniformly distributed in the product.

We have made runs at this phase of our process using various types of prior art type high-speed agitation-sand grinders, ball mills, colloid mills, and combinations of the foregoing. However, such type of processing as just mentioned does not produce as good results as may be obtained by the use of an apparatus such as will be described in connection with FIG. 2 of the present invention. On the other hand, as will be described hereinafter, in some instances it may be possible to obtain acceptable operation with the use of a Kady mill, certain stone mills, and certain 3- or 5-roll mills of the type used for ink dispersion. However, these latter combinations are not regarded as giving results as superior as the results obtained by using the procedure which will be described herein, particularly with respect to our FIG. 2.

To the special dispersed type slurry produced by a procedure of the present invention as described above there is then added the polymeric material with which the additive is to be incorporated. The quantity of the polymeric solid which is added to our special slurry may be relatively high. This solid-slurry composition is then subjected to relatively simple mixing together with some heating to obtain a solution of the polymeric solid thereby obtaining a flowable liquid having a high solid content.

This relatively concentrated solid-solvent composition just mentioned is a composition which will form a gel very easily but if held under the proper temperature conditions may be readily flowed by gravity or by pumping or the like to an extrusion-cutter mechanism. Our preferred extrusion-cutter functions to force this flowable material just described through a pelleting die. The face of this die is bathed with cold water or similar cooling liquid thereby shock-cooling the pellets that are formed in this extrusion operation. This cooling causes the extruded gel material to set to relatively solid pellets which may be conveniently floated in the water or other cooling liquid to further processing steps.

The solid pellets of the present invention containing the polymeric base material, the additive and the solvent and some water are then conducted to a distillation vessel. In this distillation unit, which is preferably operated all or at least a part of the time under reduced pressure, the pellets are subjected to steam distillation whereby the solvent is driven off and may be condensed or otherwise recovered for re-use or other purposes. This leaves solid pellets consisting of the additive very thoroughly and intimately distributed in the polymeric base material. It is believed, as compared with the prior art, that a significantly better distribution of additive has been accomplished. There is present a certain amount of water. At this point antioxidants and the like treating agents may be applied to the pellets which take up such treating agents, particularly if they are heated slightly.

The pellets just described may then be transferred to a shaker mechanism in which the pellets are dried and otherwise processed for packaging or for feeding into further operations such as blending with additional polymeric material. That is, the pellets produced by the present invention resemble regular polymeric molding pellets and may be readily intermixed with such molding pellets to prepare compositions containing various proportions of ingredients depending upon the quantity of one type of pellet mixed with the natural molding pellets. For example, mixing a small quantity of the pellets of the present invention with regular polyethylene molding pellets and melting the mixture in an extruder, Banbury mill, or other type of plastic mixer, gives improved products for extrusion and injection molding. In this manner the products of the present invention mix uniformly with the regular or natural material to give a diluted or extended material with the same fine dispersion of the additive or additives. These diluted or extended materials can then be used for injection molding, wire covering, extrusion, paper coating, film extrusion, and other applications where a pigmented polymer is desired. In addition, such formed products exhibit enhanced properties with respect to weather and stress cracking.

Figure 2:
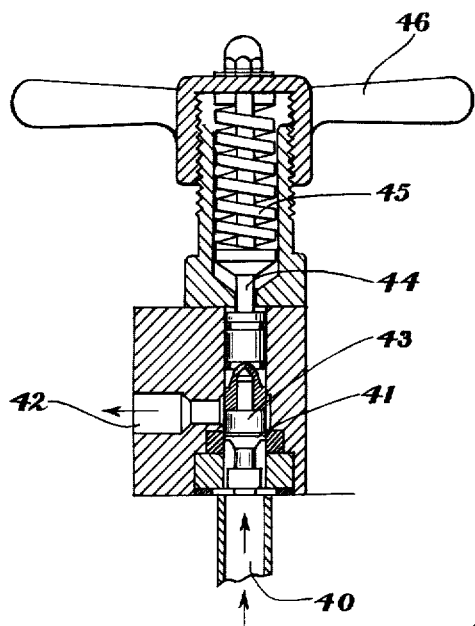
Figure 3:
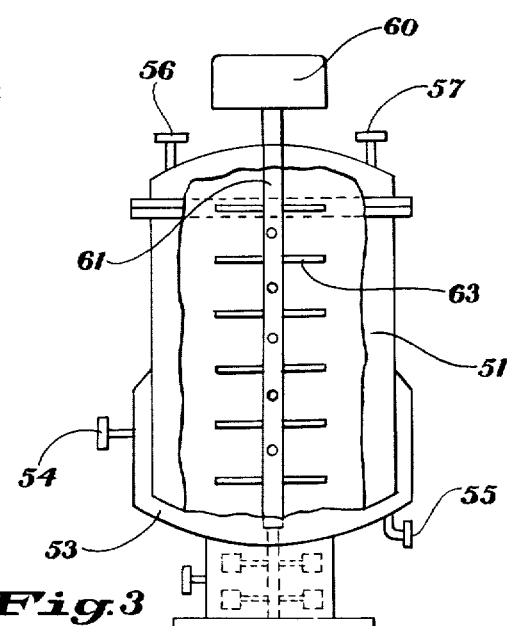

For more complete understanding of our invention reference may be made to the attached drawings forming a part of the present application. In these drawings FIG. 1 is a semi-diagrammatic side elevation view of an apparatus arrangement, in the nature of a flow sheet, showing a combination of equipment for carrying out process. FIG. 2 is a diagrammatic side elevation view in section of a device such as may be employed in our dispersing step. FIG. 3 is a side elevation view partly in section of the dissolver unit shown in our FIG. 1.

Referring to FIG. 1, 10 represents a slurry tank. This tank may be of any conventional construction and is provided with means at 11 and 12 for introducing a solvent and additives. The lower portion of slurry tank 10 is provided with a high-speed pump-conduit combination 13, 14, and 15 whereby a portion of the contents of tank 10, namely a portion of the slurry, may be pumped out of the tank and passed through conduit 16 into disperser units 17 and 18. The conduit 15 provides a means for returning a portion of the material back to tank 10 for agitation and back pressure purposes. In other words, the pumping system just described may be equipped with back pressure regulators and the like devices known in industry so that a portion of the slurry can be delivered through conduit 16 at a substantially constant rate and pressure and another portion returned through conduit 15 back to the tank for agitation and the like purposes.

While two dispersing units 17 and 18 have been shown and this is the minimum we would generally prefer to use, several such units may be connected in series.

The last dispersing unit is connected with the delivery conduit 19 which feeds the dispersed slurry into dissolver 20. Also feeding the dissolver 20 is another conduit 21 through which may be introduced the base polymer material with which the slurry is to be incorporated.

Since details of construction of parts 17, 18 and 20 will be described in connection with FIGS. 2 and 3, further description thereof at this point is unnecessary.

Dissolver 20 discharges through line 22 into a unit designated overall as extrusion and cutting unit 23. This extrusion and cutting unit may be of various constructions, it being sufficient to refer to constructions already shown in Patents 1,952,556 and 2,286,405. For the purposes of the present invention it is pointed out that in this extrusion and cutting unit 23 the material flowing through conduit 22 is extruded through a die for forming the material into pellets. Preferably the face of the die is bathed in cold water or equivalent cooling medium whereby the gel is quickly cooled so that solid pellets are formed. As described in the patents just mentioned, the extrusion devices are provided with cutter mechanisms which cut the extruded material into a pellet form.

In order that the materials may be held at the proper temperature, conduit 22 may be jacketed and also may contain a corebuster. By such construction the liquid entering conduit 22 from the bottom of dissolver 20 would be spread to the side walls of the conduit 22 thereby permitting the preliminary cooling of the hot liquid to some extent before it enters the extrusion and cutting assembly 23. After the pellets have been formed, cut and shock-cooled with water as just described, they are conducted through member 24 into the unit 25. Unit 25 may be of any conventional construction suitable for carrying out steam distillation. That is, in unit 25 will be contained the pellets which have just been formed together with some water. Preferably unit 25 would contain a stirring device indicated at 26. Means would be provided at 27 for the introduction of steam. Further conduit means would be provided at 28 so that the solvent which is distilled off may be withdrawn from the distillation unit to condensation or other recovery. That is, the volatilized solvent may be condensed and reused or various absorbent systems may be used for collecting the volatilized solvent. In addition, conduit 28 may be connected to a vacuum pump (not shown) or the vacuum pump may be otherwise attached in known ways to unit 25 for producing reduced pressure within the unit 25.

The pellets after distillation in unit 25 pass through conduit 29 onto a shaker screen or a similar mechanism 30. This device 30 may be of any conventional construction whereby hot air may be blown through the pellets as at 31 and the pellets are shaken off the end of the apparatus into receiver 32.

Reference will now be made to FIG. 2 which shows a dispersing unit of the type represented at 17 or 18 in FIG. 1. This dispersing unit is provided with an inlet 40, which inlet would be connected, for example, with conduit 16 of FIG. 1. This inlet is adapted to feed to and through an orifice member 41. This orifice member is interposed between the inlet 40 and the exit passageway 42. The exit passageway on the last disperser would be adapted to connect with conduit 19 of FIG. 1.

Positioned above and in association with the various parts making up the orifice is a plunger member 43 which has associated therein rod 44, spring member 45, and the like parts whereby varying amounts of pressure may be exerted against the orifice by turning down handle 46. By such construction as just described, the slurry pumped in at 40 is caused to pass through the orifice member 41 thereby becoming dispersed. Varying degrees of dispersion can be obtained by regulating the pressure on the orifice member.

As can be seen from FIG. 2 the spring 45 presses two flat surfaces together at 41. These surfaces are constructed of hard material, such as tungsten carbide, to withstand the wear. These surfaces are lapped to make them flat. While the showing in FIG. 2 is diagrammatic, it will be understood that the orifice surfaces may be surrounded at the periphery by an impact ring and other details of construction may be employed for preventing the dispersed slurry from eroding the walls of the several parts which house the orifice 41 or otherwise improving the functioning of the device. Dispersing devices such as described in connection with FIG. 2 may be obtained commercially. Hence, extended description thereof appears unnecessary.

Referring now to FIG. 3, this figure shows in some detail the dissolver unit shown more diagrammatically at 20 in FIG. 1. This dissolver unit is made up of a large first chamber 51 having connected to the bottom thereof a smaller more elongated chamber 52. The larger first chamber is provided with jacket 53 to which heating medium may be introduced at 54 and withdrawn at 55. Inlet means are provided at 56 for introducing slurry. That is, inlet 56 is adapted to be connected with conduit 19 of FIG. 1. Also provided in the upper part of unit 51 is another inlet means 57 which connects with conduit 21 of FIG. 1 and is for the introduction of the polymeric base material.

Positioned on the top of dissolver 51 is a motor housing 60 which contains suitable motor drive means. Connected with the motor is a shaft 61 which extends down through both units 51 and 52. The lower portion of this shaft rides in bearing 62. Positioned on the shaft are a plurality of rod agitators 63 and paddle agitators 64. The lower section 52 is jacketed at 65 and provided with an outlet conduit 66.

The function of this unit is to mix together the dispersed slurry introduced at 56 with the solid polymer base introduced at 57. As the mixing is accomplished the mixed ingredients, which as already mentioned above comprise a viscous liquid, flow to the bottom of the unit and are withdrawn through outlet 66. This outlet is connected with the jacketed conduit 22 described in connection with FIG. 1.

An understanding of the operation of the various apparatus parts just described as well as a further understanding of our invention will be had from a consideration of the following examples. The following examples are set forth primarily for illustrating the preferred embodiments of our invention and are not to be considered an undue limitation thereon.

*Example I*

In accordance with this example it was desired to incorporate finely-divided carbon black into polyethylene. The carbon black particles which we used were of a relatively small size, having an arithmetic mean diameter of 26 millimicrons. Because of the attraction of these fine particles for one another their use presents certain problems because these fine particles tend to form small clusters or agglomerates that have diameters up to 44 microns. Because of the small particle size such agglomerates may be rather tightly bonded.

In accordance with this example a preliminary slurry was made up comprising about 7½ weight percent of the carbon black in 92½ percent of commercial xylene solvent. In making up this preliminary slurry the xylene was placed in a tank such as exemplified by tank 10 and the carbon black added slowly thereto over a period of an hour or more. Also sufficient time was allowed so that the added carbon black had an opportunity to become fully wetted by the xylene solvent. The slurry was then mixed in the tank with conventional mixing equipment for a few hours whereupon it was ready to be fed to the dispersing treatment.

In this particular example by using a high-speed centrifugal pump (positioned as at pump 13 of FIG. 1) with a partial return of the pump liquid by means of a conventional back pressure regulator, good feed was accomplished to the disperser units as well as agitation of the slurry in tank 10 accomplished. That is, the high speed of the pump tends to further shear the slurry and break up any lumps which might have incidentally formed. The return of the excess slurry in return line 15 which was provided with a discharge jet causes agitation of the slurry in the tank.

The slurry as just described comprising about 7½ weight percent of the very fine carbon black in solvent was fed under 20–60 p.s.i.g. pressure into the first unit of a series of dispersers of the type described in detail above with reference to FIG. 2. In the particular disperser unit used the pressure was stepped up on the slurry to 5,000–8,000 p.s.i.g. and then discharged through the spring loaded dispersing valve. This high pressure in addition to providing the force for moving the slurry at a high velocity through the apparatus, further causes the solvent to wet the finely divided carbon particles by compressing any absorbed gases in or on the carbon black to a very small portion of its original volume. Satisfactory results can be obtained when the pressure on the slurry in a disperser unit is stepped up to from 1,000–8,000 p.s.i.g. before discharging it through the spring loaded dispersing valve.

When the carbon black with the air still compressed as just described enters the dispersing orifice or valve there is a substantially instantaneous pressure drop back to 20–60 p.s.i.g. and an instantaneous acceleration of flow to a velocity say over 20,000 feet per minute and as high, for example, as 57,000 feet per minute.

Under the conditions just described we subjected our carbon black slurry in the present example to the following three types of actions:

(1) Extreme turbulence, cavitation and shear
(2) Rapid expansion of gas within the carbon black cluster causing an explosion of the particles
(3) A shattering impart against the impact ring surrounding the valve.

Accordingly, with the passage of the slurry through at least two units in series such as the two units 17 and 18 and preferably through three units, even extremely small particle size additives can be so distributed and incorporated into the solvent vehicle that there is substantially no tendency for settling out or the formation of agglomerations.

While we have just mentioned the employment of three units in series, it is possible to employ more units. It is also possible in some instances to use fewer units by recycling material through the units and by such recycling subject the slurry to more passes per unit.

The slurry thus treated was then fed to a dissolver unit. Preferably this dispersed slurry will be preheated to about 100° C. However, if a dissolver is used such as has been described above in connection with FIG. 3, which dissolver is suitably jacketed, the necessary heat or further heat for the dissolving can be supplied to the dissolver through such jacket.

In accordance with this example, also metered into the dissolver in addition to the dispersed slurry was an amount of polyethylene pellets sufficient to give a ratio of about 4 parts by weight of polyethylene to one part by weight of the carbon black. The polyethylene pellets had a melt index of approximately 1.1. In other words, in the dissolver there was a composition comprising about 6% carbon black, 23% polyethylene, and about 71% of the xylene solvent. By agitating this composition for a fraction of an hour to an hour under temperature conditions of about 120° C., the solid polyethylene dissolved in the xylene and the carbon black became uniformly and intimately distributed into such polyethylene. This composition was drawn to the bottom of the dissolver with agitation. The liquid at the bottom of the apparatus is quite viscous. For example, the viscosity may be between 30 to 70 poises and due to the relatively high concentration of solid in the xylene solvent there may be a tendency of this liquid to gel if cooled to too low a temperature. However, in this example, the liquid was only quickly cooled to about 80° C. before feeding to an extrusion-cutter. This cooling to 80° C. was accomplished farily rapidly by flowing the liquid through a jacketed conduit containing a corebuster, there being no material agitation of the liquid during the passage through this cooled conduit.

The liquid thus cooled was then substantially immediately fed into an extrusion-cutter wherein it was extruded through a die face in the form of small rods of about 1/8" diameter. These small rods upon emerging from the die face were immediately bathed in cold water and cut into small pellets about 1/8" long, which pellets floated in the water. This procedure permitted the obtaining of relatively rounded pellets.

The pellets in water formed as aforementioned were then conducted to a solvent removal step. That is, the wet pellets were flushed into a vessel designed for steam distillation (under a reduced pressure of 20 inches of mercury). For substantially uninterrupted operation more than one such steam distillation unit may be used. That is, when one amount of pellets is being steam distilled in one vessel the other steam distillation vessel can be used to collect another group of wet pellets.

These pellets, while still suspended in a certain amount of water, were agitated during which time live steam was introduced into the unit. The presence of the water and the agitation prevents the pellets from becoming overheated or sticking together during the distillation. The steam is preferably added at the bottom of the vessel through a jet in order to adequately distribute the heat. The temperature of the distillation rises to approximately 65° C. (at a reduced pressure of, for example 18–20 inches of mercury) which is the boiling point of the xylene-water azeotrope. This xylene-water azeotrope was distilled off and condensed to recover the xylene solvent, which solvent may be returned for further use. As the steam is continuously added and the azeotrope is removed, the boiling point increases to about 72° C. which is the boiling point of water under the conditions of reduced pressure existing in the equipment. By this distillation procedure, substantially all of the xylene is removed from the pellets leaving a solid relatively easily manageable pellet but a pellet which is relatively non-porous. At this point in our process of this example we added to the distillation unit a water slurry containing an antioxidant. The composition of this antioxidant was approximately 10% of the antioxidant chemical DNPD in water. In order that the antioxidant adhere better to the pellets, in this example we turned off the reduced pressure and allowed the temperature of the unit to rise to nearly 100° C. by thus warming the pellets the surface of the pellets softened somewhat thereby permitting the pellets to better take up the antioxidant. Also by raising the temperature somewhat as just described any small traces of the xylene which might not have been removed by the reduced pressure treatment were stripped off.

The treated pellets prepared as just described, which pellets are still in the presence of some moisture, were then discharged to an apparatus referred to as a shaker table. This may be any conventional equipment whereby the pellets fall on a screen or the like and are thereby separated from the water. These pellets were then treated with hot air so that they were dried from about 6% moisture down to about 2% moisture.

A further finishing up treatment of the pellets can be applied at this point if desired. For example, the pellets can be transferred from the shaker mechanism to a standard drier apparatus and further dried to reduce the moisture content to substantially zero.

After finishing the pellets produced by this example, which finished pellets contain about 20–25% uniformly and well-distributed carbon black, some of these pellets were blended with enough natural polyethylene pellets of about the same size to give a material which would yield about 1.5–2.5% carbon black in the finished product. The natural polyethylene pellets just referred to were of a polyethylene having a melt index of about 1.1 and the pellets were of approximately 1/8" diameter. This blend was then extruded in a standard extruder to produce polyethylene pellets of about 1/8" diameter.

For the purposes of comparison, the pellets produced by the present example, as just described, were tested as shown in the table below using comparable pellets also having 1.5–2.5% carbon black therein but in which the carbon black was incorporated by prior art methods, and also a sample was made with natural polyethylene containing no carbon black.

TABLE

| Property | Units | ASTM Method | Natural Base | Prior Art | Present Example |
|---|---|---|---|---|---|
| Melt Index | dg. mm.-1 | D1238-52T | 1.1 | 1.06 | 1.04 |
| Percent Carbon Black a | | | 0 | 2.0 | 1.86 |
| Pipe Stress Crack Test b | | | | 31 | 139.5 |
| Coefficient of Light Absorption | | | | 5,000 | 5,100 |
| Weatherability c | | | 100 | 400 | 600 | a The carbon black used in both instances was Witco 32.
b Tested at 100 p.s.i. hoop stress at 73° F., 50% R.H. using Antarox A-230 as the reagent.
c This accelerated weathering test was made in an Atlas Weatherometer, Model XW. The times recorded were required for each sample to reach the same condition of degradation as related to an increase in brittleness temperature. In the present comparison the art material showed a brittleness temperature rise of 20° C. in 100 hours while the example showed no measurable increase after 600 hours.

As can be seen from the data set forth in the table, the polyethylene product of the present example exhibited better weathering and stress cracking characteristics than either the natural polyethylene product or the polyethylene product wherein the additive was incorporated by prior art procedure.

*Example II*

In accordance with this example, the particular additive which it was desired to incorporate into polyethylene was about 1.5–2.5% of carbon black. The polyethylene base material had a melt index of approximately 1.1 and was otherwise similar to the polyethylene described in connection with Example I. Likewise the procedure in this example of first incorporating the additive in a solvent was generally similar to the steps described in detail in connection with Example I. However, in this Example II the particular solvent used rather than being xylene was toluene.

The steps of operation employed in this Example II are briefly the same as Example I except as follows:

(1) A carbon black with an arithmetical mean diameter of 17 millimicrons was used.

(2) Enough Santo White Crystals antioxidant was added with the carbon black to give a concentration of 0.1 weight percent in the final product containing 2.6 wt. percent carbon black.

(3) The dissolver was run at a pressure above atmospheric in order to increase the temperature of the solution.

(4) No further antioxidant was added after steam distillation.

The pellets obtained by this example were mixed with natural polyethylene of 0.3 melt index and pellets were made, which products were tested and compared with check samples. These tests indicated the following results:

(1) Because of the properties inherent in the particular polyethylene of this melt index this example and the prior art material showed satisfactory stress crack resistance at the end of 300 hours by the Bell Crack Test.

(2) When placed in a Bell Weatherometer, Model XW, both the example and check sample showed no deterioration at the end of 600 hours. A sample of natural polyethylene of the same melt index showed surface degradation at the end of 80 hours.

(3) The dispersion of the carbon black in the present instance showed near perfect dispersion when viewed through a 100-power microscope. The check sample that was extended in the same equipment showed some agglomeration of the carbon black still remained.

(4) Microscopic examination of the material of the present instance showed no gels, oxidized, or charred material. The check material showed some of the above contamination due to the high shear method of incorporating the carbon black.

*Example III*

In accordance with this example it was desired to make a color concentrate containing cadmium red No. 598G. The procedure was the same as for Example I except that two colloid mills in series were substituted for the orifice type dispersers. This change was made because this particular pigment did not require as fine a degree of dispersion as did the carbon black and because it contained impurities that would cause excessive abrasion of the disperser valves. The product which contained 20% pigment when extended to a 2% pigment dispersion in 1.7 melt index polyethylene did not give an increase in weatherability over a material made by the prior art methods but did give a product that was more resistant to stress-cracking. This property is important when molding colored formulations for use as housewares—particularly dishpans.

Other pigments that have been dispersed according to the present example are $TiO_2$, Lithium Yellow 1475, and Yellow 2206.

*Example IV*

In accordance with this example it was desired to make a concentrate of an anti-blocking agent to be incorporated in polyethylene film formulas. The particular additive used was a brilliant white silica of the trade name Cab-O-Sil. This material is better than 99.5% pure silica having an ultimate particle size diameter of 0.015 to 0.020 micron.

The concentrate was prepared by the same procedure as Example I. This material was then blended with a 1.7 melt index polyethylene suitable for film extrusion to obtain a final additive concentration of 1 wt. percent. The blend was extruded and pelleted. These pellets when extruded gave a film that had greatly improved non-blocking characteristics. Blocking is the tendency for two smooth surfaces to cling together after being pressed together. The Cab-O-Sil particles gave a microscopic rough surface to the film that could not be seen by the naked eye due to the excellent dispersion.

A concentrate prepared by the prior art method of incorporating solids into polyethylene usually creates contamination in the polyethylene because of oxidation or degradation of the polymer. It is difficult to incorporate this concentrate into a film formula without a large reduction in the quality of the product. In the present example the properties of the film formula was improved without a reduction in quality.

In the above examples, while we have illustrated our invention as applied to the use of certain solvents and base materials, such as xylene used with polyethylene wherein the polyethylene had a melt index of 0.1 to 25, other combinations of materials may be processed by the present invention. For example, solid polypropylene may have additive incorporated in a manner as described above. When other base materials are used or with polyethylene, various other solvents such as tetrachloroethylene, toluene, and trichloroethylene may be used. In general, the particular solvent chosen not only should be a solvent for the polymer but should have the property of being able to wet the additive which is to be incorporated in the polymer. While our invention is particularly useful for very finely divided particles, it may be efficiently used for particles of a size within the range of $1 \times 10^{-5}$ to 100 microns. In addition to incorporating carbon black, other additives such as $CaCO_3$, $Ca_3(PO_4)_2$, Cab-O-Sil, and various pigments may be employed in a similar manner.

The concentration of the additive both in the solvent slurry and in the pellet produced is relatively high in comparison with the amount of additive which heretofore it has been able to satisfactorily incorporated into base materials. For example, in the slurry the concentration of the additive is usually greater than 5% and is dependent on the final additive-polyethylene ratio and the maximum viscosity of the dispersed slurry. The concentration of the additive in the pellet is usually at least 20% but may be as high as 85%. By these relatively higher concentrations there is, of course, the advantage that the use of less solvent is required per pound of additive and also greater capacity is obtained with the dissolving, distilling and the like apparatus. While in our preferred embodiment we would use a dispersing apparatus such as illustrated in FIG. 2 of the present application, in some instances it is possible to use apparatus exemplified by certain colloid mills, certain high-speed stone mills, and certain 3- or 5-roll mills used for preparing ink dispersions. By a colloid mill we refer to the type of apparatus described on page 1169 of Perry's Chemical Engineers Handbook, Revised, Third Edition. Nevertheless, in order to obtain suitable distribution of extremely fine particles it is important that the additive be contacted with the solvent under conditions of extreme turbulence, cavitation and shear.

As already described above, while we prefer to use a jacketed tube containing a corebuster for quickly cooling the solution before it is subjected to extrusion, other arrangements which permit rapidly lowering the temperature of the slurry down to 70 or 80° C. such as a Votator may be used.

The pellets containing additive produced by the present invention not only are advantageous in that the additive is better distributed in the pellet but pellets provide a convenient form for handling and blending. That is, a certain amount of the pellets can be blended with further pellets of natural polymeric material to give a product having, for example, a 2–3% concentration of additive. Or a larger quantity of the pellets may be blended to obtain products having for example, 15–20% of the additive in the finished, molded product. Therefore, molded polyolefin products may be readily obtained having various degrees of additive concentration, coloration, and the like.

Pellets manufactured in accordance with the present invention and containing only 2–3% of carbon black show an excellent distribution of the carbon obtained by the present invention and the carbon black particles are not individually apparent even when a piece of the polyethylene is viewed under a 100 power microscope. Furthermore, as illustrated above, molded products utilizing the present invention exhibit enhanced weather and stress cracking characteristics. It is therefore believed apparent from the foregoing that by the present invention we have provided an improved method, apparatus and products.

We claim:

1. In the method of incorporating finely divided additives into a polyolefin resin the steps which comprise (1) preparing a slurry comprising (a) at least one additive to be incorporated into a polyolefin resin and (b) an organic solvent for the resin, which solvent will wet the additive, the amount of additive present in the slurry being greater than 2% of the total weight of the slurry, (2) forcing the prepared slurry through an orifice under a pressure from about 5000 to 8000 p.s.i.g. and into a zone of substantially reduced pressure having a substantially larger cross-sectional area than that of the orifice wherein the velocity of the slurry is instantaneously increased substantially, said zone of reduced pressure having impact means so disposed therein as to be impinged upon with great force by the slurry of increased velocity, whereby the slurry is subjected to extreme impact, turbulence, cavitation and shear and there is provided a substantially stable slurry, and (3) admixing the stable slurry with the polyolefin resin at elevated temperatures to dissolve substantially all the polyolefin resin in the solvent component of the slurry whereby there is provided a flowable composition comprised of the additive, the solvent, and the polyolefin resin said composition being characterized in that the finely divided additive is substantially uniformly and thoroughly dispersed therein.

2. In the process of incorporating a finely divided additive into a resin selected from the group consisting of polyethylene and polypropylene, the steps which comprise (1) preparing a slurry comprising, (a) at least one finely divided additive selected from the group consisting of carbon black, calcium carbonate, calcium phosphate, and silica, which additive is to be subsequently incorporated into a resin selected from the group consisting of polyethylene and polypropylene and (b) an organic solvent for the resin, which solvent will wet the additive, the amount of additive present in the slurry being greater than 2% of the total weight of the slurry, (2) extruding the prepared slurry through an orifice under a pressure of from about 5000 to 8000 p.s.i.g. and into a zone of substantially reduced pressure having a substantially larger cross-sectional area than the cross-sectional area of the orifice wherein the velocity of the slurry is instantaneously increased substantially, said zone of reduced pressure having impact means so disposed therein as to be impinged upon with great force by the slurry of increased velocity, whereby the slurry is subjected to extreme impact, turbulence, cavitation, and shear and there is provided a substantially stable slurry, and (3) admixing the stable slurry with the resin at elevated temepratures to dissolve substantially all the resin in the solvent component of the slurry whereby there is provided a flowable composition comprised of the additive, the solvent, and the resin, said composition being characterized in that the finely divided additive (a) is substantially uniformly and thoroughly dispersed therein.

3. In the method of preparing an article of manufacture comprised of a polyolefin resin and an additive, the additive being thoroughly and uniformly dispersed throughout the resin, the steps which comprise (1) preparing a slurry comprising (a) at least one additive to be incorporated into a polyolefin resin and (b) an organic solvent for the resin, which solvent will wet the additive, the amount of additive present in the slurry being greater than 2% of the total weight of the slurry, (2) flowing the prepared slurry through a confined flow path having disposed therein a zone of constricted cross-sectional area, (3) forcing the slurry through the constricted zone under a pressure of from about 5000 to 8000 p.s.i.g. and into a zone of substantially reduced pressure having a substantially larger cross-sectional area than the constricted zone wherein the velocity of the flowing slurry is instantaneously increased substantially, said zone of reduced pressure having impact means so disposed therein to be impinged upon with great force by the slurry of increased velocity, whereby the slurry is subjected to extreme impact, turbulence, cavitation, and shear and there is provided a substantially stable slurry, (4) admixing the stable slurry with the polyolefin resin at elevated temperatures to dissolve substantially all the resin in the solvent component of the slurry and to provide a composition comprised of the additive, the solvent, and the resin, (5) shaping the composition into shaped members and (6) removing the solvent therefrom, the amount of resin admixed with the slurry at (4) being sufficient to provide a member, after solvent removal, in which the amount of additive is within the range of from about 10% to 85% of the total weight of the member.

4. In the method of preparing an article of manufacture comprised of a resin selected from the group consisting of polyethylene and polypropylene and an additive, the additive being thoroughly and uniformly dispersed throughout the resin, the steps which comprise (1) preparing a slurry comprising (a) at least one finely divided additive selected from the group consisting of carbon black, calcium carbonate, calcium phosphate, and silica, which additive is to be subsequently incorporated into a resin selected from the group consisting of polyethylene and polypropylene and (b) an organic solvent for the resin, which solvent will wet the additive, the amount of additive present in the slurry being greater than 2% of the total weight of the slurry, (2) flowing the prepared slurry through a confined flow path having disposed therein a zone of constricted cross-sectional area, (3) forcing the slurry through the constricted zone under a pressure of from about 5000 to 8000 p.s.i.g. and into a zone of substantially reduced pressure having a substantially larger cross-sectional area than the constricted zone wherein the velocity of the flowing slurry is instantaneously increased substantially, said zone of reduced pressure having impact means so disposed therein as to be impinged upon with great force by the slurry of increased velocity, whereby the slurry is subjected to extreme impact, turbulence, cavitation, and shear and there is provided a substantially stable slurry, (4) admixing the stable slurry wtih the resin at elevated temperatures to dissolve substantially all the resin in the solvent component of the slurry and to provide a composition comprised of the additive, the solvent, and the resin, (5) shaping the composition into shaped members, and (6) removing the solvent therefrom, the amount of resin admixed with the slurry at (4) being sufficient to provide a member, after solvent removal, in which the amount of additive is within the range of from about 10% to 85% of the total weight of the member.

5. In the method of preparing pellets comprised of a polyolefin resin and an additive, the additive being thoroughly and uniformly dispersed throughout the resin, the steps which comprise (1) preparing a slurry comprising (a) at least one additive to be incorporated into a polyolefin resin and (b) an organic solvent for the resin, which solvent will wet the additive, the amount of additive present in the slurry being greater than 2% of the total weight of the slurry, (2) flowing the prepared slurry through a confined flow path having disposed therein a zone of constricted cross-sectional area, (3) forcing the slurry through the constricted zone under a pressure of from about 5000 to 8000 p.s.i.g. and into a zone of substantially reduced pressure having a substantially larger cross-sectional area than the constricted zone wherein the velocity of the flowing slurry is instantaneously increased substantially, said zone of reduced pressure having impact means so disposed therein as to be impinged upon with great force by the slurry of increased velocity, whereby the slurry is subjected to extreme impact, turbulence, cavitation, and shear and there is provided a substantially stable slurry, (4) admixing the stable slurry with the polyolefin resin at elevated temperatures to dissolve substantially all the resin in the solvent component of the slurry and to provide a composition comprised of the additive, the solvent, and the resin, (5) cooling the composition to a temperature of from about 50° C. to 100° C., (6) extruding the cooled composition into shaped members, (7) cutting the shaped members into the form of pellets, and (8) removing from the pellets substantially all solvent contained therein, the amount of resin admixed with the slurry at (4) being sufficient to provide a pellet, after solvent removal, in which the amount of additive is within the range of from about 10% to 85% of the total weight of the pellet.

6. In the method of preparing pellets comprised of a resin selected from the group consisting of polyethylene and polypropylene and an additive, the additive being thoroughly and uniformly dispersed throughout the resin, the steps which comprise (1) preparing a slurry comprising (a) at least one finely divided additive selected from the group consisting of carbon black, calcium carbonate, calcium phosphate, and silica, which additive is to be subsequently incorporated into a resin selected from the group consisting of polyethylene and polypropylene and (b) an organic solvent for the resin, which solvent will wet the additive, the amount of additive present in the slurry being greater than 2% of the total weight of the slurry, (2) flowing the prepared slurry through a confined flow path having disposed therein a zone of constricted cross-sectional area, (3) forcing the slurry through the constricted zone under a pressure of from about 5000 to 8000 p.s.i.g. and into a zone of substantially reduced pressure having a substantially larger cross-sectional area than the constricted zone wherein the velocity of the flowing slurry is instantaneously increased substantially, said zone of reduced pressure having impact means so disposed therein as to be impinged upon with great force by the slurry of increased velocity, whereby the slurry is subjected to extreme impact, turbulence, cavitation, and shear and there is provided a substantially stable slurry, (4) admixing the stable slurry with the resin at elevated temperatures to dissolve substantially all the resin in the solvent component of the slurry and to provide a composition comprised of the additive, the solvent, and the resin, (5) cooling the composition to a temperature of from about 50° C. to 100° C., (6) extruding the composition into shaped members, said members emerging from the extrusion under water, (7) cutting the shaped members into the form of pellets as they emerge under water, (8) distilling from the formed pellets substantially all solvent contained therein, and (9) drying the pellets, the amount of resin admixed with the slurry at (4) being sufficient to provide a pellet, after solvent removal, in which the amount of additive is within the range of from about 10% to 85% of the total weight of the pellet.

7. An article of manufacture produced in accordance with the method of claim 3.

8. An article of manufacture produced in accordance with the method of claim 4.

9. A pellet produced in accordance with the method of claim 5.

10. A pellet produced in accordance with the method of claim 6.

References Cited in the file of this patent

UNITED STATES PATENTS

| | | |
|---|---|---|
| 1,918,370 | Beckmann et al. | July 18, 1933 |
| 2,375,730 | Caldwell et al. | May 8, 1945 |
| 2,457,962 | Whaley | Jan. 4, 1949 |
| 2,470,001 | Stober | May 10, 1949 |
| 2,752,321 | Heller | June 26, 1956 |
| 2,786,822 | Vesce | Mar. 26, 1957 |

UNITED STATES PATENT OFFICE
CERTIFICATE OF CORRECTION

Patent No. 3,085,988                      April 16, 1963

David C. Hull et al.

It is hereby certified that error appears in the above numbered patent requiring correction and that the said Letters Patent should read as corrected below.

Column 2, line 12, for "the" read -- then --; column 11, lines 8, 39 and 69, column 12, lines 32 and 64, and column 13, line 29, for "5000", each occurrence, read -- 1000 --.

Signed and sealed this 19th day of November 1963.

(SEAL)
Attest:

ERNEST W. SWIDER

Attesting Officer

EDWIN L. REYNOLDS

Acting Commissioner of Patents